A. CHRISTIANSON.
BRAKE.
APPLICATION FILED AUG. 24, 1910.
999,153.
Patented July 25, 1911.
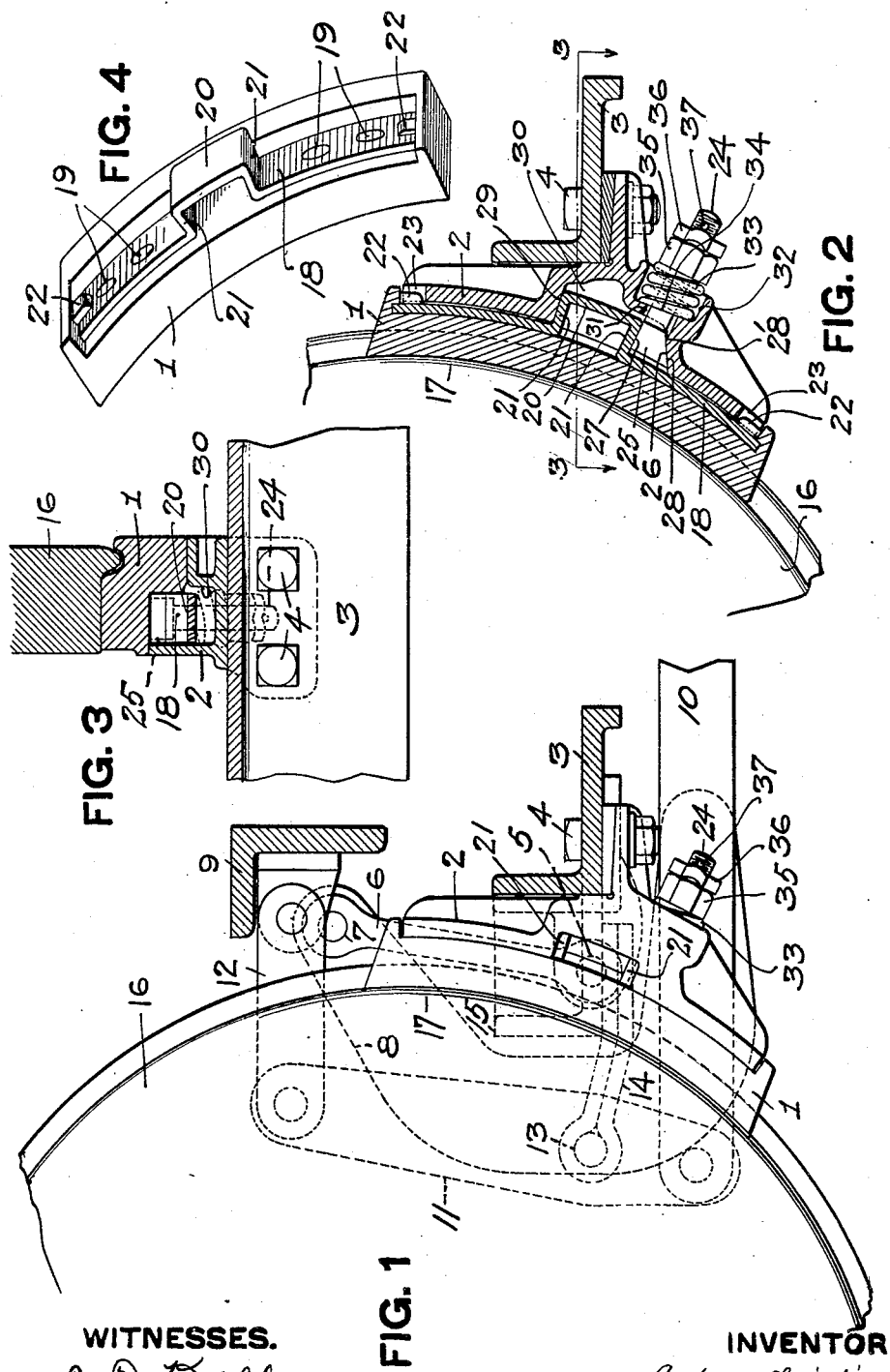

UNITED STATES PATENT OFFICE.

ANDREW CHRISTIANSON, OF BUTLER, PENNSYLVANIA.

BRAKE.

999,153.  Specification of Letters Patent.  Patented July 25, 1911.

Application filed August 24, 1910. Serial No. 578,643.

*To all whom it may concern:*

Be it known that I, ANDREW CHRISTIANSON, a resident of Butler, in the county of Butler and State of Pennsylvania, have invented a new and useful Improvement in Brakes; and I do hereby declare the following to be a full, clear, and exact description thereof.

My invention relates to brakes, and particularly to brakes employed with railway car wheels. Its object is to provide an improved construction of brake or brake shoe and head which will prevent rattling when the brakes are not actually applied to the wheels, and which will also lessen the liability of accidents due to broken shoes falling on the track and derailing the cars.

My invention contemplates the prevention of rattling by the construction of brake head itself irrespective of the nature of the brake beam or supporting lever construction.

To these ends my invention consists principally in the combination of a brake head, a brake shoe carried thereby and a resilient connection comprising or including a spring, between said head and said brake shoe, whereby said brake shoe is maintained in constant fitting contact with said head.

It also consists in certain other features of construction and improvements as hereinafter more specifically set forth.

In the drawings Figure 1 is a side view partly in section of a brake embodying my invention; Fig. 2 is a longitudinal section of the brake illustrated in Fig. 1; Fig. 3 is a horizontal section on the line 3—3 Fig. 2; and Fig. 4 is a detail perspective view illustrating a brake shoe and the relatively soft metal back employed therewith.

The brake illustrated is in general arrangement of a type usually employed in connection with street railway or railroad cars having the brake shoe 1, the brake head 2 carrying the same and fastened to the supporting brake beam 3 as by the bolts 4 illustrated. The brake beam 3 is pivoted at 5 to the brake beam hanger 6, which is pivoted at 7 to the bracket 8 rigid with the truck frame 9 illustrated. The connecting rod 10 is pivoted to the dead lever 11 which is in turn pivoted at its other end to the link 12 pivoted to the truck frame 9. The dead lever 11 is pivotally connected at 13 to the arm 14 attached to the bracket 15 rigid with the brake beam 3. The brake illustrated is applied to the wheels 16 by movement of the brake rod 10 in the ordinary manner, the brake actuating the pivoted dead lever 11 and through the pivoted arm 14 moving the brake beam 3 carrying the brake head 2 to apply the brake shoe 1 to the wheel.

The above described mechanism forms no part of this invention and may be varied as desired, the invention consisting essentially in the construction of brake proper or brake head and the parts carried thereby. The brake shoe 1 is attached initially to the brake head 2 in any desired fashion, the attaching lugs or keys 22 illustrated as integral with the steel back 18, being shown registering within the slots 23 of the brake head 2 and being fitted therewithin in attaching the brake shoe in a manner corresponding in general to the well known Christy type of brake, although it will be understood that any other desired construction of brake head and shoe may be employed in so far as the means for mating and fitting the brake shoe to the head is concerned. The brake shoe 1 has the face or shoe portion proper 17 of chilled iron, hard metal or other material of great surface wearing capacity and the steel back 18 preferably constructed of forged steel or other tough and relatively soft ferrous metal preferably cast integral with the face portion 17, being keyed thereto in casting as illustrated at 19 in Fig. 4. The brake shoe back 18 has the lug 20 integral therewith and preferably formed as a hollow or open and centrally located lug having its walls of substantially the same thickness as the steel back member 18. The lug 20 has its sides 21 of flaring shape, being constructed preferably so that their traces in the plane of the section illustrated in Fig. 2 are substantially radii from the wheel center. The lug is thus adapted to act as a wedge, as explained below.

The key-bolt 24 is provided with the head 25 having the side faces 26 and 27 at an angle to each other, so that the sloping face 26 mates with the face 28 of the recess or cavity 30 in the brake head 2, and the face 27 mates with the side wall 21 of the lug 20, the opposite side wall 21 mating with the opposite face 29 of the recess 30 and forming an angle with the face 27. The cavity 30 is thus of outwardly flaring or wedge shape. The key-bolt 24 passes through the bolt hole 31 opening into the recess 20 and spring pocket 32 of the brake head 2.

Around the key-bolt 24 is coiled the spring 33, which abuts against the spring seat 34. The spring seat 34 is preferably set at an angle relative to a perpendicular to the axis of the bolt 24. The nut 35 and jam nut 36 illustrated serve to hold the bolt and spring in position and key the brake shoe 1 to the brake head 2, as will be evident from inspection of Fig. 2. If desired, the nut 35 may be further securely fastened by a cotter pin, (not illustrated) passing through the hole 37 in the bolt 24.

In setting up the device the bolt 24 is first seated within the recess 30 and the spring 33 within the spring pocket 32, the nut 35 being in loosened position on the bolt 24 so that the head 25 thereof will be in extended position and also move sidewise due to the angular face 26, of its head 25 and angular wall 38 of the recess 30. The brake shoe 1 is then applied sidewise to the brake head 2 and the lugs 22 fitted within the slots 23 in a manner well understood in the art, the lug 20 being permitted to pass into the recess 30 by the extended and sidewise position of the bolt head 25. The bolt 24 is then tightened by the nut 35 so that its wedge-shaped head 25 is retracted, acting as a spreader to key the lug 20 within the slot or recess 30. This particular construction of lug and bolt head forms a specific subject of my invention, as well as the integral lug formed as part of the steel or relatively soft metal back 18. These parts, however, also are merely one means of fastening the brake shoe to the brake head in a manner suitable to the use therewith of the spring 32 which provides a resilient connection between the brake shoe and brake head. Thus the spring 33, which is compressed to some extent by the application of the nut 35, continually exerts pressure tending to retract the bolt head 25 and thereby more securely fasten the lug 20 within the recess 30, as well as draw the entire brake shoe 1 into mating fit with the brake head 2. In applying the brakes the pressure of the brake beam 3 will necessarily always hold the brake shoe 1 in fitting contact with the brake head 2. However, it is well understood that the great pressures exerted in braking railway cars necessarily tend to loosen or start the connection between the brake head and brake shoe so that even if the head still effectively supports the shoe the shoe will become loosely fitting to the head and will necessarily rattle at all times except during the application of the brakes. This rattling when once started is a source of increased wear to the parts as well as a cause of great noise and general annoyance along the route of the railroad or street railway.

By my invention the spring 33 employed will cause the brake shoe 1 to return to mating contact with the brake head 2 immediately on the removal of the brakes from braking position, so that rattling is effectively prevented. By providing the sloping spring seat 34 I further insure the perfect fit of the brake shoe within the head 2, as the pressure of the spring will be exerted at an angle to the axis of the bolt 24 and therefore tends to draw the bolt head 25 along the side wall 28 of the recess 30 instead of pivoting the same about the point 28'. By this means I obtain a continuous mating fit between the brake shoe and brake head, as distinguished from a fit at two or other small number of points, although the resilient and continually tightening means for maintaining a continuous fit is broadly within the scope of my invention. It will be noticed that in use the spring 33 continually tends to tighten the fit of the brake shoe within the brake head, as when the brake is applied and the great pressure tends to force the brake shoe within the brake head, the spring automatically takes up the play within the slot 30 and tightens the bolt head 25 and lug 20 therewithin. When the brake is removed from the wheel the spring acts to maintain the brake shoe in its tightened fit within the brake head 2.

What I claim is:

1. A car brake, comprising a shoe and a brake head mutually provided with means for fastening the same together, and resilient means coöperating with said fastening means to maintain a continuous mating fit between said shoe and head.

2. A car brake comprising a brake-head, a shoe supported thereby, a spreader operative on said shoe to fasten the same within said head, and a spring operative on said spreader.

3. A car brake, comprising a brake shoe provided with a lug, a brake head provided with a cavity, keying means for holding said lug within said cavity and resilient means coöperating therewith for taking up the play between said head and shoe and maintaining a constant fit between said keying means and said lug.

4. A car brake, comprising a brake shoe, a brake head carrying the same, a key fastening said shoe to said head and a spring operative on said key to continually tighten the same.

5. A car brake, comprising a shoe, a brake head carrying the same, a bolt carried by said head and fastened to said shoe and a spring around said bolt adapted to maintain a continuous tight fastening between the same and said shoe.

6. A car brake, comprising a shoe provided with a lug, a head having a slot adapted to receive said lug, a bolt provided with a head adapted to fasten said lug within said slot and a spring adapted to maintain a continuous fastening therewithin.

7. A car brake, comprising a shoe provided with a lug, a brake head provided with a slot to receive said lug and carrying a bolt having its head in fitting contact with one wall of said lug, the opposite wall of said lug being at an angle to said wall, and fitting a face of said slot, and a spring adapted to hold said bolt head in mating contact with said lug and maintain said brake shoe in continuous fit within said brake head.

8. A car brake, comprising a brake head provided with a slot, having its opposite walls at an angle to each other, a brake shoe provided with a lug having one of its walls in fitting contact with one of said walls of said slot, a bolt carried by said brake head and having a head provided with a face in fitting contact with another wall in said lug and an opposite face in fitting contact with the opposite wall of said slot, and a spring operative to retract said bolt head within said slot.

9. A car brake, comprising a brake head provided with a slot, having its opposite walls at an angle to each other, a brake shoe provided with a lug having one of its walls in fitting contact with one of said walls of said slot, a bolt carried by said brake head and having a head provided with a face in fitting contact with another wall in said lug and an opposite face in fitting contact with the opposite wall of said slot and adapted to admit said bolt, said pocket having a spring set at an angle to a perpendicular to said bolt, and a spring within said pocket.

10. In railway car brakes, a brake shoe provided with a wedge shaped lug, a brake head carrying the same and provided with a wedge shaped cavity, a key bolt having a wedge shaped head in said cavity and a spring operative on said bolt to hold said shoe in position in the head.

11. In railway car brakes, a brake shoe provided with a wedge shaped lug, a brake head carrying the same and provided with a wedge shaped cavity, a key bolt having a wedge shaped head in said cavity, a spring, and a nut on said bolt adapted to fasten said shoe in position in said head by compression of said spring.

12. In railway car brakes, a brake shoe provided with a lug having its opposite walls angularly disposed, a brake head carrying said shoe and having a cavity to receive said lug provided with opposite walls, a spreader key and means for fastening said lug in said cavity by retracting said spreader key to force said angularly disposed walls into mating contact.

13. A car brake, comprising a brake head provided with a slot, having its opposite walls at an angle to each other, a brake shoe provided with a lug having one of its walls in fitting contact with one of said walls of said slot, and a key provided with a face in fitting contact with another wall in said lug and an opposite face in fitting contact with the opposite wall of said slot.

14. In railway car brakes, a brake shoe having a wedge-shaped surface, a brake head having a wedge-shaped surface, a wedge-shaped key-bolt located between the wedge-shaped surfaces of the shoe and head, a spring and a nut connected to said key-bolt, the shoe being held in position in the head by the wedge action of the bolt when tightened by the nut and spring.

15. In a railway car brake, a brake shoe, a brake head a wedge-shaped key-bolt, a spring and a nut, the shoe secured to the head by the wedge action of the bolt when the spring is compressed by the nut.

In testimony whereof, I the said ANDREW CHRISTIANSON have hereunto set my hand.

ANDREW CHRISTIANSON.

Witnesses:
WM. A. STEINMEYER,
JOHN F. WILL.

---

Copies of this patent may be obtained for five cents each, by addressing the "Commissioner of Patents, Washington, D. C."